(12) United States Patent
Tarasinski et al.

(10) Patent No.: US 7,727,114 B2
(45) Date of Patent: Jun. 1, 2010

(54) AGRICULTURAL MACHINE WITH PTO TORQUE LIMITING FEATURE

(75) Inventors: Nicolai Tarasinski, Frankenthal (DE); Marco Reinards, Bleialf (DE)

(73) Assignee: Deere & Company, Moline, IL (US)

( * ) Notice: Subject to any disclaimer, the term of this patent is extended or adjusted under 35 U.S.C. 154(b) by 529 days.

(21) Appl. No.: 11/316,659

(22) Filed: Dec. 22, 2005

(65) Prior Publication Data
US 2006/0191359 A1 Aug. 31, 2006

(30) Foreign Application Priority Data
Jan. 21, 2005 (DE) .................. 10 2005 002 880

(51) Int. Cl.
*B60W 10/10* (2006.01)
(52) U.S. Cl. ............... 477/110; 477/108; 180/53.7
(58) Field of Classification Search .......... 477/107, 477/108, 110; 180/53.1, 53.3, 53.7
See application file for complete search history.

(56) References Cited

U.S. PATENT DOCUMENTS

| | | | |
|---|---|---|---|
| 4,576,065 A | 3/1986 | Speranza et al. | |
| 5,740,044 A | 4/1998 | Ehrenhardt et al. | ... 364/426.033 |
| 6,536,402 B2 * | 3/2003 | Houchin et al. | ......... 123/198 D |
| 6,546,705 B2 * | 4/2003 | Scarlett et al. | ........... 56/10.2 R |
| 6,619,451 B2 * | 9/2003 | Hrazdera | .................... 192/3.58 |
| 6,704,637 B1 * | 3/2004 | Hrazdera et al. | .............. 701/93 |
| 2006/0128524 A1 * | 6/2006 | Busch | ........................ 477/110 |
| 2006/0162475 A1 * | 7/2006 | Eriksson et al. | ............... 74/335 |

FOREIGN PATENT DOCUMENTS

DE 38 10724 12/1988
EP 1 153 538 11/2001

OTHER PUBLICATIONS

German Search Report, May 21, 2008, 8 Pages.

* cited by examiner

*Primary Examiner*—David D Le
*Assistant Examiner*—Derek D Knight

(57) ABSTRACT

A drive assembly for an agricultural machine. A power take off (PTO) output shaft is connected to a driving motor for driving an attachment. A drive transmission is positioned between and interconnects the driving motor and the support wheels of the agricultural machine. An input device is connected to an electronic control unit. A sensor senses the torque transferred between an attachment and the PTO output shaft, and an actuator is configured to change the transmission ratio of the drive transmission, thereby setting the propulsion speed of the agricultural machine such that the torque transferred between the PTO output shaft and an attachment does not exceed a pre-determined value. The electronic control unit further receives data from the input device and calculates a pre-determined value based on the data received, and thereafter controls the actuator accordingly.

6 Claims, 3 Drawing Sheets

AGRICULTURAL MACHINE WITH PTO TORQUE LIMITING FEATURE

BACKGROUND OF THE INVENTION

1. Technical Field

The invention relates to a drive assembly of an agricultural machine with a driving engine, which is connected to a power take off (PTO) output shaft for driving an attachment, wherein the torque taken off at the PTO output shaft is limited to a predefined desired value.

2. Background of the Invention

In the prior art, agricultural tractors are equipped with a driving engine, which in operation drives the wheels to advance the tractor, and a power take-off shaft, which is used to drive attachments, such as agricultural implements or balers. A power take-off gearbox is switched between the engine and the PTO output shaft. Such power take-off gearboxes normally have several transmission stages, which may be selected by an operator, and result in the desired speeds of the PTO shaft. The transmission ratio of a drive transmission inserted into the drive train between the driving engine and the wheels can be charged stepwise or continuously to change the driving speed of the tractor.

In a prior tractor and a baler combination, by measuring the torque at the power take-off shaft of the tractor, information is obtained on the flow rate, which is proportional to the torque, of the material picked up by the baler, and is compared to a desired flow rate. If the desired flow rate is above or below a certain value, the propulsion speed of the tractor is changed by automatically regulating the transmission ratio of the drive transmission. The speed of the driving engine, and consequently, of the power take-off shaft, remains constant. A storage medium (ROM or CD-ROM), found on board the tractor equipped with a device for reading the storage medium, is used to store the flow rates as a function of the transmission stages of the drive transmission and different swath densities. The current flow rate is determined using the measured torque. The train is driven using a comparison between the current flow rate derived from the torque at the power take-off shaft and a preset value for an optimal flow rate. The transmission stage of the drive transmission to be chosen is selected using the ratio, stored in the storage medium, between the flow rate and the transmission stage. Here, it is considered a disadvantage that the described automated control functions only when there is a suitable storage medium used each time for the attachment. If the tractor and the attachment are supplied by different manufacturers, a combined effect in the described manner is accordingly almost impossible. This control is likewise not suitable for other attachments for which there are no measurable flow rates, such as for tilling machines.

Another prior tractor is equipped with a measuring device for recording the torque taken off on a PTO output shaft. The maximum value of the torque at the PTO output shaft is stored by the operator. This may be done by manually entering the values or by selecting the corresponding attachment (cutter bar, root harvester, manufacturer) from a list of attachments stored in the central computer of the tractor, where the appropriate limiting values are stored. To prevent damaging the drive train of the tractor or of the attachment in the event of overloading, a comparison between the torque at the PTO output shaft and the specified maximum value is made. If the maximum value is exceeded, the speed of the internal combustion engine is automatically reduced. One disadvantage is that, in the event of exceeding the allowable torque, the power take-off shaft as well as the traveling gear is driven with less speed. Eliminating a possible congestion in the attachment is also not possible here because, for instance, less material than before is picked up by the intake elements of a baler. Since the speed of the power take-off shaft remains constant in relation to the driving speed, the quantity of material picked up per distance covered remains the same.

Therefore, it is desired to have a drive assembly with an internal combustion driving engine, a PTO output shaft, and a drive transmission, which enables an operator to smoothly set, irrespective of the type and manufacturer of the attachment, a desired or maximum torque at the power take-off shaft and to reduce the traveling speed when the torque is exceeded.

SUMMARY OF THE INVENTION

A self-propelled agricultural machine includes a driving engine, usually an internal combustion engine, such as a diesel engine, which drives a PTO output shaft. The driving engine also drives, via a drive transmission, drive means such as wheels or tracked driving gear to move the machine over a surface to be cultivated by an attachment that is driven by the PTO output shaft. An electronic control unit is connected to an input device, to a sensor for determining the torque at the PTO output shaft, and to an actuator, which is used for stepped or step-less changing of the transmission ratio of the drive transmission. In operation, the torque at the power take-off shaft is measured by the sensor and compared with a predetermined target torque value. If the target torque value is exceeded, the control unit causes the actuator to change the transmission ratio of the drive transmission to reduce the speed, thereby reducing the load on the attachment, and therefore, the torque at the PTO output shaft. A device enabling data input by an operator provides the data for the control unit to derive the target torque value.

Unlike the prior art, the target torque value is not pre-set, but may be entered by the operator. In this manner, the torque at the PTO output shaft can be limited for attachments of any kind and any manufacturer.

In one embodiment of the invention, not only is the torque at the power take-off shaft limited, but also controlled. The propulsion speed of the machine is regulated by the control unit such that the target torque value at the PTO output shaft is maintained, at least approximately. To prevent the operator on board the machine from having to make constant changes in speed, a change in the transmission ratio of the drive transmission takes place only when the torque measured at the PTO output shaft departs from a boundary range extending above and below the target torque value. This boundary range may be pre-set or entered by the operator, since the fluctuations of the torque taken off at the PTO output shaft may vary, depending on the type of attachment. Thus, for balers in general, smaller torque variations appear than for a self-loading forage wagon, so that in the former, a smaller boundary range would be selected than for the latter. It would also be conceivable for the control unit to automatically derive the boundary range from information about the type of attachment.

In a simple, but universally applicable variation, the input device allows quantitative input of the target torque value, for example via a keyboard or a rotatable knob or slide button that is connected to a potentiometer or to a rotary encoder disc working in combination with a photo sensor. The operator can then derive the target torque value for any attachment from an appropriate specification sheet. Another possibility is to enter information on the attachment, such as the name of the manufacturer and the type name or type number of the attachment.

Using stored information, or information downloaded from a database at another site, such as via a radio data circuit and the Internet, the control unit can then determine the target torque value. Instead of entering this data, it is also possible to equip the attachment with a storage device that communicates with the control unit via an existing bus system and transmits to the control unit the information on the target torque value or manufacturer and type of attachment. In another variant the machine is started, and as soon as the desired target torque value is reached, the operator makes the input, which causes the current torque value to be taken as the target torque value.

Advantageously, the speed of the driving engine remains at least approximately constant, while the control unit varies the propulsion speed. As a result, the PTO output shaft turns at a constant speed, so that the attachment is also always driven at its optimal speed. In the event of overloading the attachment, such as high quantities of material picked up for a baler or a self loading forage wagon, or for compressed soil areas in soil cultivation, less new material is supplied to the attachment due to the reduced speed, so that the overloading can be reduced.

The sensor for determining the torque at the PTO output shaft is preferably on board the work vehicle. The advantage of this is that there is no additional link to be established between the control unit and a sensor arranged on the attachment, and the sensor may be used for all attachments. A measurement of the torque may be made such that, for example, the torque is determined by sensors at the input and output of a power take-off shaft clutch, where the clutch slip is determined from the torques in front of and behind the clutch, by continuously setting and maintaining the clutch slip at a constant value and determining the torque transmitted by the clutch from the constant slip value and a value corresponding to the clutch pressure. Such a torque sensor is disclosed in U.S. Pat. No. 6,729,459, that is assigned to the assignee of the present application and whose contents are incorporated by reference in the present application. Suitable torque measuring shafts may be obtained from the company GKN Walterscheid, Lohmar, Germany, under reference DLC 250.

The control unit may vary the propulsion speed of the machine only at specified limits, or by means of limits to be entered by the operator. This avoids falling short of and exceeding the limits that are reasonable in field work. The upper limit may be set by means of the elements normally used for setting the speed, such as a gas pedal or a hand throttle lever or the service brake. In particular, the speed of the machine when automatic control was activated is used as the upper speed limit.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

Figure 1:
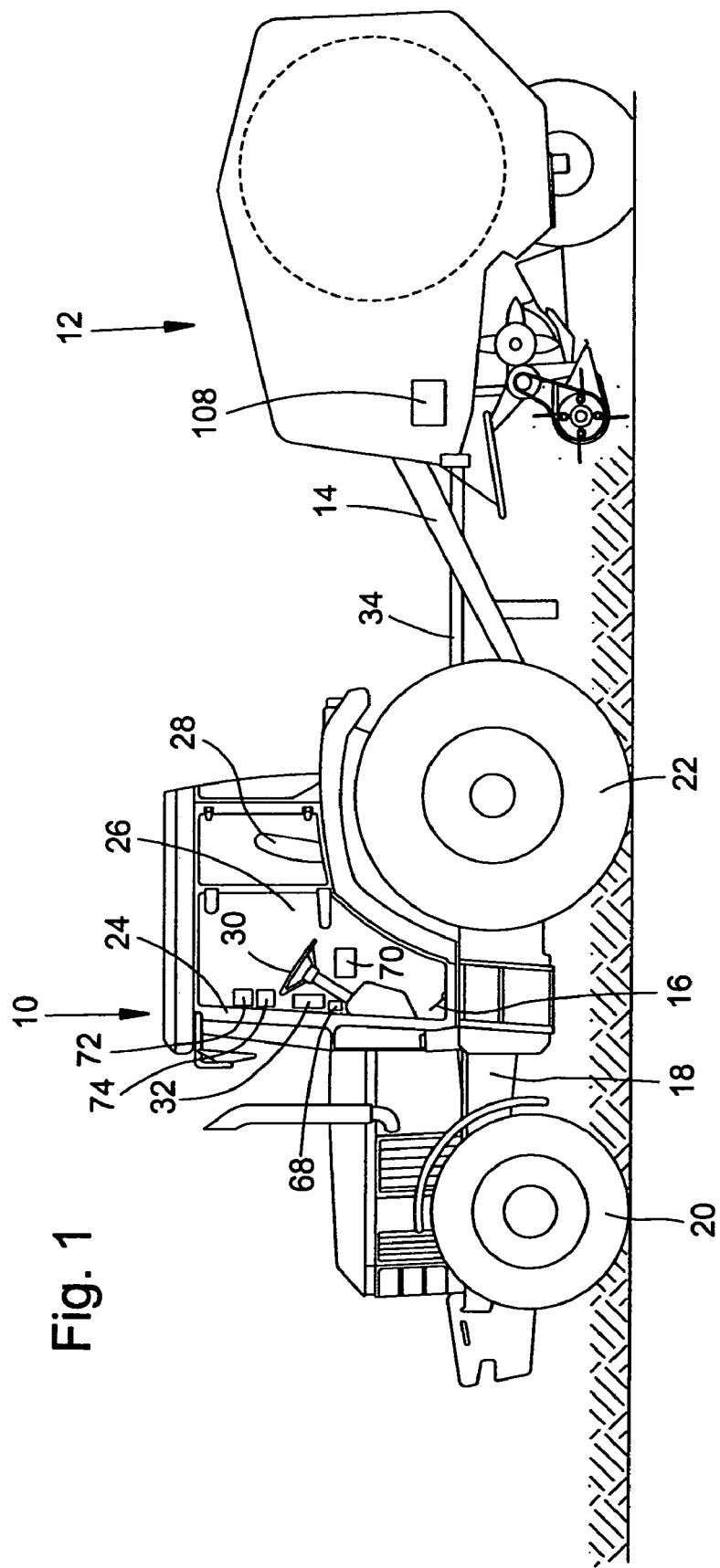
FIG. 1 is a lateral view of an agricultural machine in the form of a tractor with a trailing attachment, in the form of a round baler.

FIG. 1 shows a lateral view of an agricultural machine 10 in the form of a tractor and an attachment 12 in the form of a round baler coupled to a drawbar clutch (not shown) of the machine 10 by means of a shaft 14. Instead of the round baler, or in addition thereto, any other pulled or attached or suspended attachments, such as field choppers or driven agricultural implements, such as rotary harrows or ordered combinations, can be attached to the machine 10. The machine 10 is constructed on a supporting frame 18, which is supported on steerable front wheels 20 and movable rear wheels 22, and supports a cabin 24 where the operator's workstation 26 is located.

The operator's workstation 26 includes a seat 28, a steering wheel 30, a gas pedal 16, and another pedal for the brake and clutch (not shown), and input elements arranged in the operator's workstation 26 within reach of the operator for setting the selectable functions of the machine 10. The latter includes a selection device 32 for the transmission gear of a power take-off shaft gearbox 46, a hand throttle lever 70, a power take-off switch 68, an input device 74 for setting a target torque value at the PTO output shaft 56, and a virtual terminal 72 of a bus system that operates according to ISO 11783 with a keyboard 90 and a display device 94. The selection device 32, the input device 74, and/or the power take-off switch 68 could also be implemented as menu items on the terminal 72. Instead of the terminal 72, any other input and display devices may be used. The gas pedal 16 is provided with a sensor that transmits electrical signals to an operator interface logic unit 64, the electrical signals containing information on the particular position of the gas pedal 16.

Figure 2:
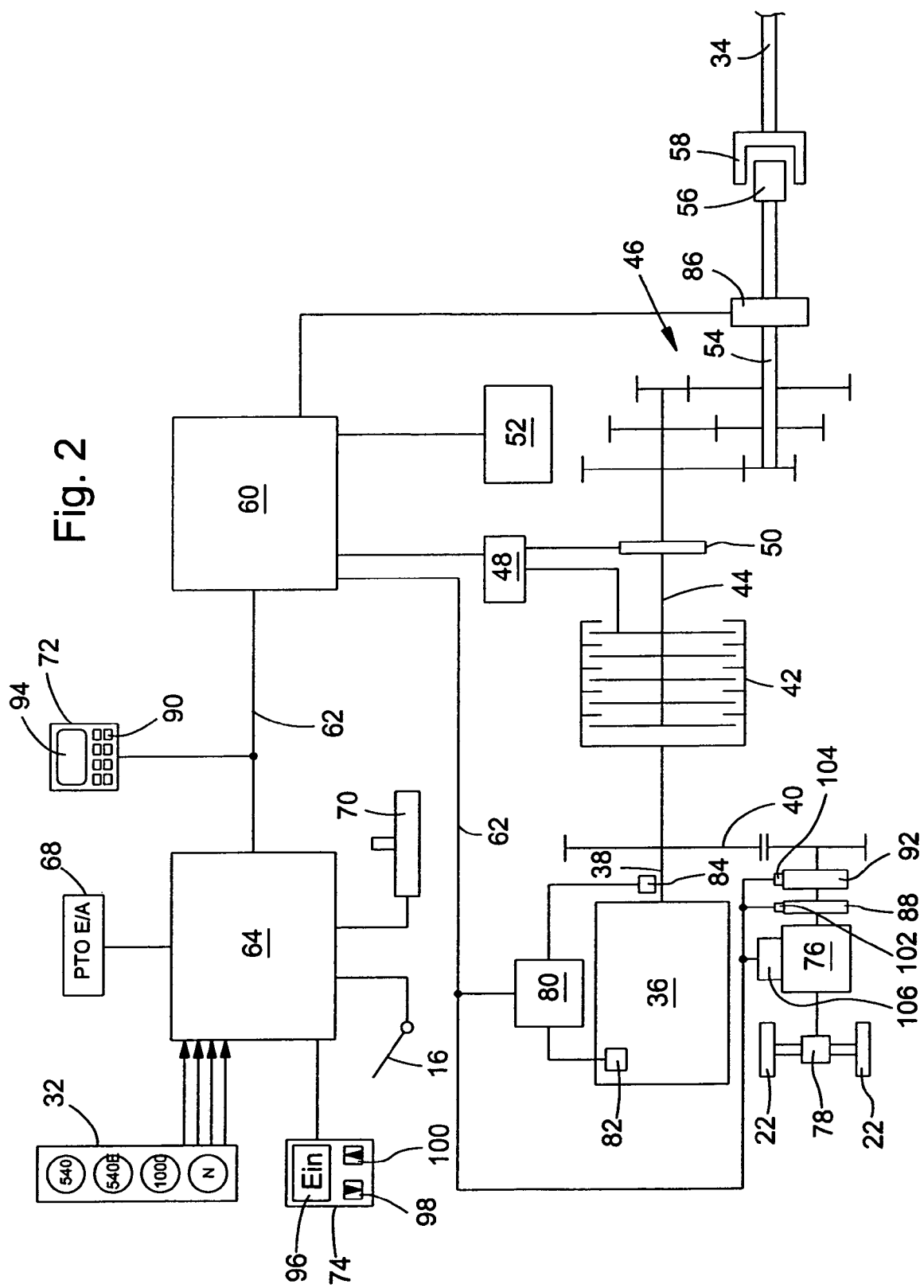
FIG. 2 is a schematic representation of the drive assembly of the machine.

FIG. 2 schematically illustrates the drive assembly of the machine 10 for driving the rear wheels 22 and a power take-off shaft 34 used for driving movable elements of the attachment 12. A driving engine 36, usually a diesel engine, drives a shaft 38, which, via a gearwheel 40, is used to drive the rear wheels 22 and preferably also the front wheels 20, and, if necessary, other movable devices of the machine 10, such as an air conditioning compressor and a power generator. The rear wheels 22, and the front wheels 20, are driven by the gearwheel 40 via a clutch 88 and a drive transmission with continuously variable transmission ratios, or with stepwise selectable ratios, but constant within the individual transmission stages, and a differential 78.

The drive transmission can, for example, be a purely hydraulic transmission with a hydraulic pump driven by the clutch 88 and a hydromotor or hydrostatic transmission moving the wheels, wherein the transmission ratio of the gear can be changed by adjusting the swash plates of the pump and/or of the engine. In another embodiment, it is a multistage mechanical gearbox with a torque converter connected in series, such as used in passenger cars, or a mechanical gearbox with a sufficient number of transmission stages and an automatically switched clutch or planet gears and friction clutches. Also conceivable is the use of a drive transmission with step-less adjustable gearing, which for instance, works with V-belts that rotate around pulleys with adjustable diameters, or with a mechanical and a hydraulic (or electrical) drive path, wherein a planetary transmission comprises an element driven mechanically with a fixed or stepwise variable speed and one driven hydraulically or electrically with variable speed, and the third element is used for output. A combination of several of the mentioned transmissions would also be conceivable.

In the illustrated embodiment, the drive transmission comprises a power shift transmission 92, which contains planetary gear sets with clutches and brakes that facilitate the changeover of speeds under load, and a secondary, manually shifted, or synchromesh, transmission 76. The power shift transmission 92 and the synchromesh transmission 76 are switched off each time with actuators, 104 and 106 respectively, for selecting the transmission stage. Since both actuators 104 and 106 are controllable independently of one another, a high number of different transmission stages are available, derived by multiplying the number of transmission stages of the power shift transmission 92 with the number of transmission stages of the synchromesh transmission 76. Further inserted in the drive train between the power shift transmission 92 and the synchromesh transmission 76 is a clutch 88, which is movable through a clutch actuator 102 between a closed and open position.

The shaft 38 is also connected to a hydraulically operable clutch 42, which is connected to the output with an input shaft 44 of a power take-off gearbox 46. The clutch 42 is actuated by means of a valve assembly 48, which is also connected to a brake 50 positioned on the input shaft 44.

The power take-off gearbox 46 has three different, selectable transmission stages and therefore comprises three meshing gearwheel pairs. The transmission stage is selected by means of an electro-hydraulic (or electrical) actuator 52 operated by external force. Movable clutch elements determine which of the three gearwheels arranged on a driven shaft 54 of the power take-off gearbox 46 is in positive torque connection with the driven shaft 54. Alternatively, the actuator 52 could establish which of the three gearwheels arranged on the input shaft 44 is in positive torque connection with the input shaft 44. The actuator 52 enables the selection of three transmission stages. In the illustrated embodiment, a first transmission stage provides, at a nominal driving engine speed of 2100 rpm, a driven shaft speed of 1000 rpm. A second transmission stage, at a lowered driving engine speed of 1800 rpm, the driven shaft speed is 540 rpm. A third transmission stage, at a nominal driving engine speed of 2100 rpm, the driven shaft speed is 540 rpm. Moreover, it is possible to not couple any of the gearwheels of the power take-off gearbox 46 with the input shaft 44 and the driven shaft 54, thereby placing the power take-off gearbox 46 into a neutral position, wherein the driven shaft 54 is freely rotatable, even when the brake 50 is activated.

The driven shaft 54 is connected to a power take-off output shaft 56 in the form of a power take-off stub shaft. The power take-off shaft 34 of the attachment 12, equipped with a sleeve shaft end piece 58, is slid onto the power take-off stub shaft. The power take-off shaft 34 is normally designed as a universal-joint propeller shaft.

An electronic control unit 60 is connected to the valve assembly 48 and to the actuator 52. Moreover, the electronic control unit 60 is connected to an operator interface logic unit 64 by means of a device bus 62 (e.g., CAN bus), which is connected to the selection device 32, the input device 74, the gas pedal 16, the hand throttle lever 70, and the power take-off switch 68. The control unit 60 is moreover connected by the bus 62 to the virtual terminal 72, the actuators 104 and 106, and the clutch actuator 102 of the clutch 88. The selection device 32 comprises four pushbuttons, which are respectively assigned to the previously mentioned three transmission stages and to the neutral position of the power take-off gearbox 46.

The selection device 32 makes it easy for the operator, through manual operation of the four pushbuttons, to select one each of the three transmission stages of the power take-off gearbox 46 or the neutral position. The user interface logic unit 64 transmits information on the operator's setting via the bus 62 to the control unit 60, which controls the actuator 52 in accordance with the information received. Each transmission stage selected may be displayed to the operator by illuminating the assigned pushbutton of the transmission stage selection device 32.

If the operator puts the power take-off switch 68 into the operating position, the operator interface logic unit 64 transmits the corresponding information, via the bus 62, to the control unit 60, which prompts the valve assembly 48 to release the brake 50 and to engage the clutch 42. If the operator puts the power take-off switch 68 into the non-operating position, the operator interface logic unit 64 analogously transmits corresponding information, via the bus 62, to the control unit 60, which prompts the valve assembly 48 to disengage the clutch 42 and to activate the brake 50.

The control unit 60 is connected, via the bus 62, to an engine-actuated control 80, which in turn controls an injection assembly 82 of the driving engine 36 and to which information about the respective speed of the shaft 38 is fed by a speed sensor 84. A sensor 86 connected to the control unit 60 determines the torque transmitted by the driven shaft 54. The speed sensor 84 may optically (through perforated rotary encoder discs connected to the shaft 38) or magnetically (through magnets connected to the shaft 38, which work together with induction coils, reed relays or hall sensors) interact with the associated shaft 38 to determine the speed. The speed may also be determined by other suitable means. The sensor 86 comprises strain gauges positioned on the driven shaft 54, whose terminals are connected to the control unit 60 by means of sliding contacts, in order to determine the elastic torsion of the driven shaft 54 caused by the transmitted torque. Any other embodiments of the sensor 86 may be used, for instance, laser sensors for determining the torsion of the driven shaft 54.

The third input device 74 comprises three keys 96, 98 and 100. The first key 96 is used to switch on an automatic mode of operation and the other keys 98, 100 to reduce (key 98) or enlarge (key 100) the target torque value at the driven shaft 54.

In operation, the control unit 60 instructs the engine-actuated control 80 to let the driving engine 36 run at a speed that corresponds to the current input of the selection device 32, i.e., depending on the pressed key of the selection device 32, with a fixed speed of 2100 rpm or 1800 rpm. Alternatively, the speed is entered by the operator via a torque input device (not shown) or via the virtual terminal 72. If the neutral position is selected, the torque of the driving engine 36 will depend on the position of the gas pedal 16 or of the hand throttle lever 70, or is entered by the user, or is pre-set.

In operation, the propulsion speed of the machine 10 is initially specified by the gas pedal 16 or the hand throttle lever 70. The control unit 60 then controls the actuators 104 and 106 and, before and after operating the actuator 106, the clutch actuator 102 for disengaging and engaging the clutch 88, so that the drive transmission drives the wheels 22 at the desired speed. The torque at the driven shaft 54, measured by the sensor 86, is displayed on the display device 94 of the virtual terminal 72.

As soon as the displayed torque corresponds to a target torque value that is optimal and appropriate for the attachment 12, the operator can operate the key 96 of the input device 74. The control unit 60 then ignores the inputs from the gas pedal 16 or the hand throttle lever 70, and by operating the actuators 104 and 106, adjusts the propulsion speed of the machine 10 such that the torque measured by the sensor 86 at least approximately corresponds to the target torque value. Key 98 facilitates a step-by-step decrease of the target torque value and key 100 facilitates a step-by-step increase of the target torque value, e.g., in increments of 10 Nm. Alternatively, or in addition, the desired target torque value may be entered via the keyboard 90 of the virtual terminal 72 as a numerical value. Furthermore, the manufacturer and type of attachment 12 may be entered via the keyboard 90 and the control unit 90 derives the target torque value therefrom using a database. The target torque value can also be stored in memory, connected to the bus 62, on board the attachment 12, and the control unit 60 obtains it from the memory 108 as needed.

Figure 3:
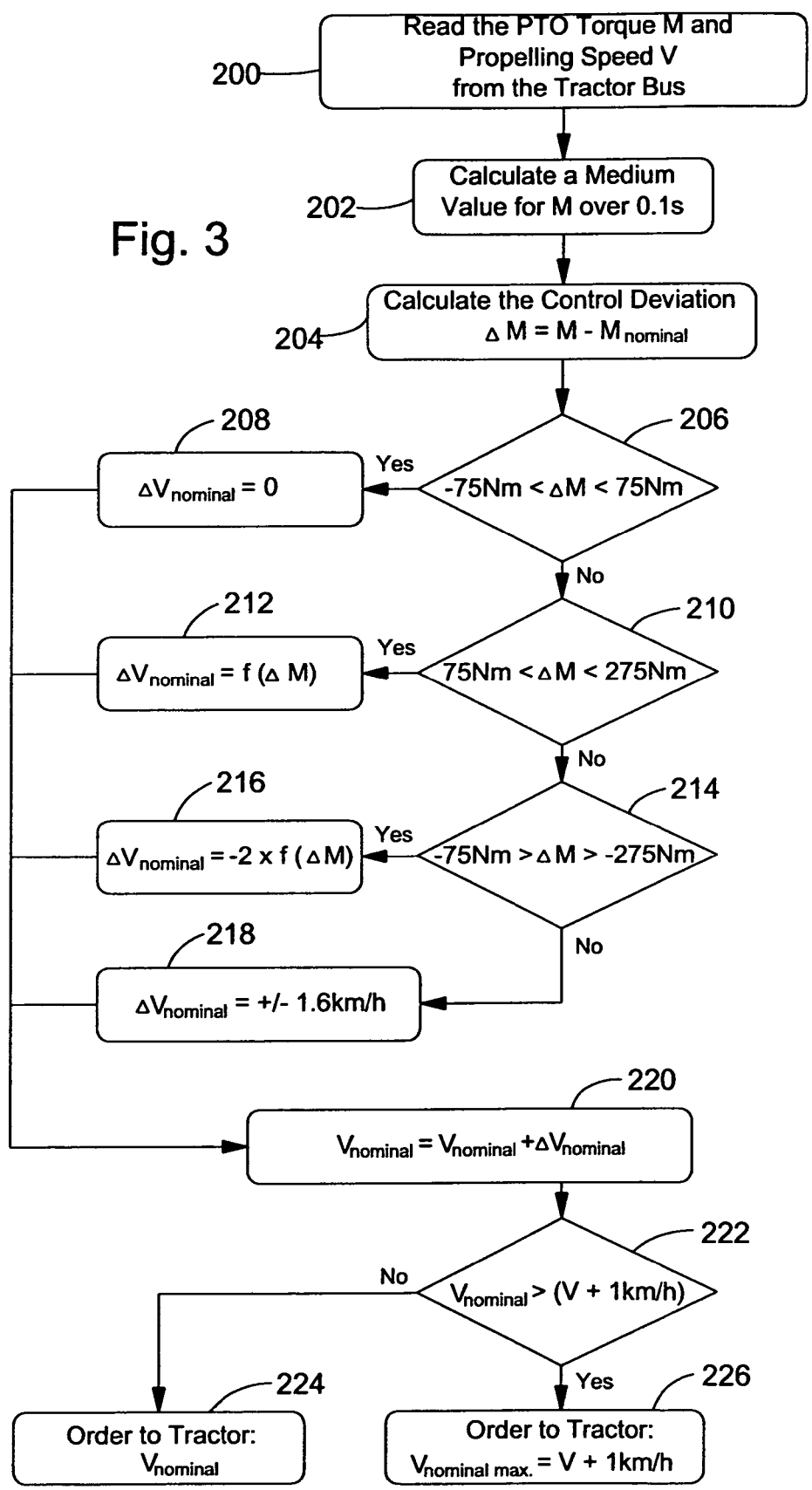
FIG. 3 is a flow chart of a program under which the control unit operates when regulating the torques.

The routine that runs in the control unit 60 is illustrated in the program flow chart of FIG. 3. The power take-off shaft torque is recorded in Step 200 via the bus 62, and is smoothed out in Step 202 with a sliding average formation for 0.1 sec, i.e., 10 values at a 100 Hz sampling frequency. After computing the deviation in Step 204, the computation of the change in speed takes place in accordance with a three-step controller with secondary proportional control and an acceleration as well as velocity limiter in Steps 206 to 226.

If the mean torque taken in Step 206 moves within a tolerance range of 75 Nm above or below the target torque, the driving speed remains constant in Step 208. The value of 75 Nm represents a compromise among the various tasks. For greater torque deviations in self loading forage wagons, 100 Nm would be better, whereas 50 Nm will suffice for mowing or baling straw. It is conceivable to provide the driver with an opportunity to input the tolerance range.

If the amount of deviation is greater than the tolerance of 75 Nm, but less than the so-called adjustment tolerance of 275 Nm (Step 210, 214), a change in speed takes place (Step 212, 216). If the torque is too high, the range of acceleration in the region of 0 to 0.9 m/s$^2$ is computed proportional to the torque deviation; on the other hand, if the target torque is not reached, acceleration is done at 0 to 0.45 m/s$^2$. The mentioned maximum values of acceleration of −0.9 m/s$^2$ when braking and 0.45 m/s$^2$ when accelerating were chosen during field tests in accordance with subjective sensitivity for a comfortable automatic controller action. Even the value of 275 Nm above and below the tolerance limit for the acceleration range coupled to the torque deviation has been empirically determined in practice, and can remain set constant for all tasks. For even greater deviations, the speed is changed by an established value (Step 218). If necessary, the brake of the machine 10 could also be activated through the control unit 60.

After Step 220, wherein the new theoretical value for the propulsion speed is calculated, there is no increase in the target speed if the difference from the actual speed is greater than a determined value (here, 1 km/h, for example) (Step 222, 224). Otherwise, (Step 226), the speed is increased. The maximum speed accordingly corresponds to the propulsion speed driven when the control algorithm is switched on. Consequently, it is possible at anytime for the driver to limit or reduce the speed manually by pulling back the hand throttle lever 70 or stepping on the brake pedal without increasing the target speed without limit. At the start of a swath, actuating the brake for a short time will suffice, for instance, to bring too high a driving speed in the headland to a reasonable level for travel over the field.

As will be appreciated by one skilled in the art, it is anticipated that the functions of the operator interface logic unit 64, the engine control unit 60 and the engine control 80 may be realized in an alternative manner, for example through a single unit and or hardware.

In accordance with the provisions of the patent statutes, the present invention has been described in what is considered to represent its preferred embodiment. However, it should be noted that the invention can be practiced otherwise than as specifically illustrated and described.

The invention claimed is:

1. A drive assembly for an agricultural machine comprising:
    a driving engine;
    a power take off (PTO) output shaft connected to the driving engine for driving an attachment;
    a drive transmission positioned between and interconnecting the driving engine and wheels that support the agricultural machine on the ground;
    an electronic control unit;
    an input device connected to the electronic control unit for operating the electronic control unit;
    a sensor that determines the torque transferred between an attachment and the PTO output shaft; and
    an actuator coupled to the electronic control unit for changing the transmission ratio of the drive transmission, thereby setting the propulsion speed of the agricultural machine such that the torque transferred between the PTO output shaft and an attachment does not exceed a pre-determined value, the electronic control unit being adapted to receive data from the input device and to calculate the pre-determined value based on the data received, and to control the actuator accordingly wherein the input device comprises a key, at the actuation of which the input device takes an actual torque value measured with the torque sensor as a nominal torque value and sends information about the attachment to the control unit.

2. The drive assembly of claim 1, wherein the speed of the driving engine is kept approximately constant.

3. The drive assembly of claim 1, wherein the sensor for determining the torque at the PTO output shaft is positioned on the attachment.

4. The drive assembly of claim 1, wherein the electronic control unit may be operated to vary the propulsion speed of the agricultural machine within one of a range that is pre-determined and a range that is entered by the operator of the agricultural machine.

5. The drive assembly of claim 4, wherein an upper limit of the propulsion speed is entered by the operator of the agricultural machine.

6. The drive assembly of claim 4, wherein an upper limit of the propulsion speed is set to the speed of the machine when automatic control of the propulsion speed is activated.

\* \* \* \* \*